(12) United States Patent
Zhu

(10) Patent No.: US 9,810,257 B2
(45) Date of Patent: *Nov. 7, 2017

(54) CONNECTING ROD LUBRICATION APPARATUS

(71) Applicant: Cummins Inc., Columbus, IN (US)

(72) Inventor: Guangrui G. Zhu, Wuhan (CN)

(73) Assignee: Cummins Inc., Columbus, IN (US)

( * ) Notice: Subject to any disclaimer, the term of this patent is extended or adjusted under 35 U.S.C. 154(b) by 10 days.

This patent is subject to a terminal disclaimer.

(21) Appl. No.: 14/626,369

(22) Filed: Feb. 19, 2015

(65) Prior Publication Data

US 2015/0159688 A1 Jun. 11, 2015

Related U.S. Application Data

(62) Division of application No. 13/793,717, filed on Mar. 11, 2013, now Pat. No. 8,973,551.

(60) Provisional application No. 61/616,627, filed on Mar. 28, 2012.

(51) Int. Cl.
| | |
|---|---|
| *F16C 7/02* | (2006.01) |
| *F16J 1/16* | (2006.01) |
| *F16C 9/04* | (2006.01) |
| *F16C 33/10* | (2006.01) |

(Continued)

(52) U.S. Cl.
CPC ............ *F16C 7/023* (2013.01); *F01M 11/02* (2013.01); *F16C 9/04* (2013.01); *F16C 33/1045* (2013.01); *F16C 33/1065* (2013.01); *F16J 1/16* (2013.01); *F16J 7/00* (2013.01); *F01M 2011/027* (2013.01); *F16C 2240/30* (2013.01);

(Continued)

(58) Field of Classification Search
CPC .. F16C 7/023; F16C 2360/22; F16C 2240/30; F16C 33/1045; F16C 9/04; F16C 33/1065; F01M 11/02; F01M 2011/027; F16J 7/00; F16J 1/16; Y10T 74/2142
USPC .......................... 123/197.3, 196 R; 74/579 E
See application file for complete search history.

(56) References Cited

U.S. PATENT DOCUMENTS

| | | | |
|---|---|---|---|
| 1,947,203 A | 1/1931 | Hetzer | |
| 1,947,023 A * | 2/1934 | Shoemaker | F16C 9/04 184/6.5 |

(Continued)

FOREIGN PATENT DOCUMENTS

| | | |
|---|---|---|
| CN | 1920314 | 2/2007 |
| CN | 101042154 | 9/2007 |

(Continued)

OTHER PUBLICATIONS

PCT/US2013/030192, International Search Report and Written Opinion, dated Apr. 26, 2013, 9 pages.

(Continued)

*Primary Examiner* — Marguerite McMahon
(74) *Attorney, Agent, or Firm* — Taft Stettitius & Hollister LLP

(57) ABSTRACT

An apparatus includes a connecting rod having a surface that defines an opening to receive a pin for coupling the connecting rod to a piston at a first end of the connecting rod. The surface includes a groove arrangement to collect, retain and distribute lubrication fluid in the space between the pin and the inner surface. The surface can be formed by the connecting rod or a bushing in an opening of the connecting rod.

8 Claims, 4 Drawing Sheets

(51) Int. Cl.
*F16J 7/00* (2006.01)
*F01M 11/02* (2006.01)

(52) U.S. Cl.
CPC ....... *F16C 2360/22* (2013.01); *Y10T 74/2142* (2015.01); *Y10T 74/2162* (2015.01)

(56) References Cited

U.S. PATENT DOCUMENTS

| | | | |
|---|---|---|---|
| 3,739,657 A * | 6/1973 | Patchen | F16C 7/023 |
| | | | 74/579 E |
| 3,842,938 A | 10/1974 | Barnes-Moss | |
| 4,105,267 A | 8/1978 | Mori | |
| 4,655,615 A * | 4/1987 | Mori | F16C 33/1065 |
| | | | 384/286 |
| 5,072,654 A | 12/1991 | MacGregor | |
| 5,112,145 A | 5/1992 | MacGregor | |
| 5,456,535 A * | 10/1995 | Chen | F16C 17/02 |
| | | | 384/291 |
| 5,797,364 A | 8/1998 | Meek et al. | |
| 6,241,394 B1 | 6/2001 | Kallenberger et al. | |
| 7,165,889 B2 | 1/2007 | Light et al. | |
| 8,973,551 B2 * | 3/2015 | Zhu | F16C 7/023 |
| | | | 123/197.3 |
| 2003/0190101 A1 | 10/2003 | Horng et al. | |
| 2006/0171824 A1 | 8/2006 | Nieter et al. | |
| 2009/0126191 A1 | 5/2009 | McEwan | |

FOREIGN PATENT DOCUMENTS

| | | |
|---|---|---|
| CN | 201778851 U | 3/2011 |
| CN | 202165391 | 3/2012 |
| EP | 1803946 A2 | 7/2007 |
| WO | 2005111445 A1 | 11/2005 |
| WO | 2006083510 A2 | 8/2006 |

OTHER PUBLICATIONS

English Translation of Chinese Office Action, Chinese Application No. 201380027739.5 dated Nov. 24, 2014, 12 pgs.
Chinese Office Action, Chinese Application No. 201380027739.5 dated Nov. 24, 2014, 10 pgs.

* cited by examiner

FIG. 3B  FIG. 3C

CONNECTING ROD LUBRICATION APPARATUS

CROSS-REFERENCE TO RELATED APPLICATION

The present application is a divisional of U.S. patent application Ser. No. 13/793,717 filed on Mar. 11, 2013, which claims the benefit of the filing date of U.S. Provisional Application Ser. No. 61/616,627 filed on Mar. 28, 2012, which is incorporated herein by reference.

TECHNICAL FIELD

The technical field relates generally to connecting rods in internal combustion engines, and more particularly but not exclusively relates to a connecting rod lubrication apparatus.

BACKGROUND

Connecting rods that connect a piston of an internal combustion engine to a crank shaft are traditionally difficult components to lubricate due to reciprocating forces alternately pulling lubricated surfaces apart and forcing the surfaces together. Lubrication of connecting rods is even more challenging at the "small end" or upper section of the rod that is connected to the piston since it is further from directly available oil. Therefore, improvements are desirable in this area of technology.

SUMMARY

A connecting rod lubrication apparatus is disclosed that improves the collection, retention and distribution of lubricating fluid at the rotatable connection of the connecting rod with a pin that couples the connecting rod to a movable device. In one embodiment, the movable device is a piston. In a further embodiment, the connecting rod includes a longitudinally extending lubrication fluid delivery passage that is obliquely oriented to the central longitudinal axis of the connecting rod. The delivery passage opens into the rotatable connection and extends from the rotatable connection through the connecting rod to an opposite end that is connectable to a source of lubricating fluid.

In certain embodiments, the rotatable connection of the connecting rod with the pin includes a groove arrangement in the surface that surrounds the pin. The groove arrangement includes first and second transverse groove portions on opposite sides of the central longitudinal axis, and an inner circumferential groove portion in the connection surface that extends between the first and second transverse groove portions. The groove arrangement can be provided directly on a surface of the connecting rod or on an inner surface of a bushing that is carried by the connecting rod.

Further embodiments, forms, objects, features, advantages, aspects, and benefits shall become apparent from the following description and drawings.

BRIEF DESCRIPTION OF THE DRAWINGS

FIG. 3B is a section view of a connection end of the connecting rod along its central longitudinal axis showing a first portion of the groove arrangement according to a second embodiment.

FIG. 3C is a section view of a connection end of the connecting rod along its central longitudinal axis showing a first portion of the groove arrangement according to a third embodiment.

DESCRIPTION OF THE ILLUSTRATED EMBODIMENTS

Figure 1:
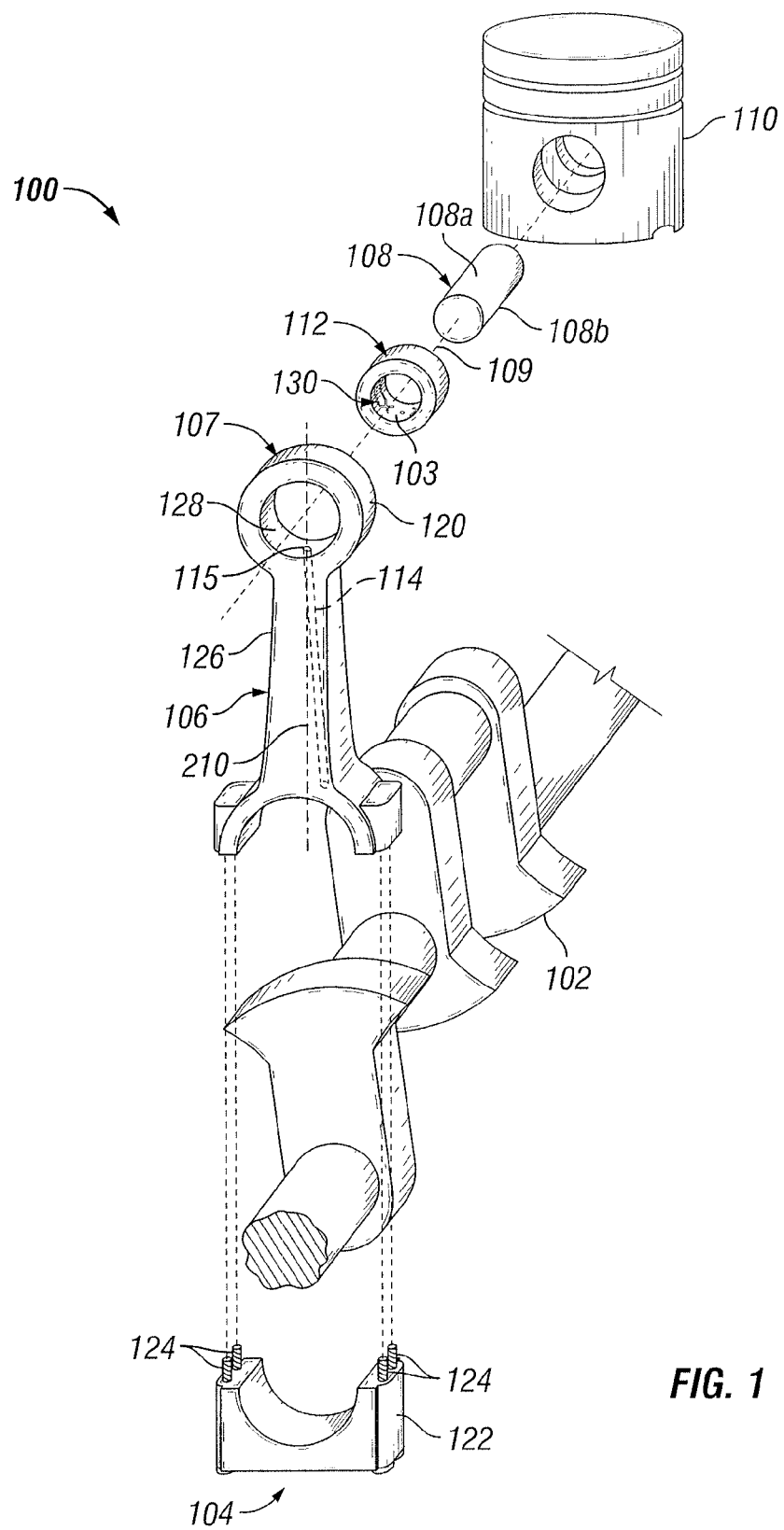
FIG. 1 is an exploded perspective view of a crankshaft and piston assembly.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated and protected.

Figure 2:
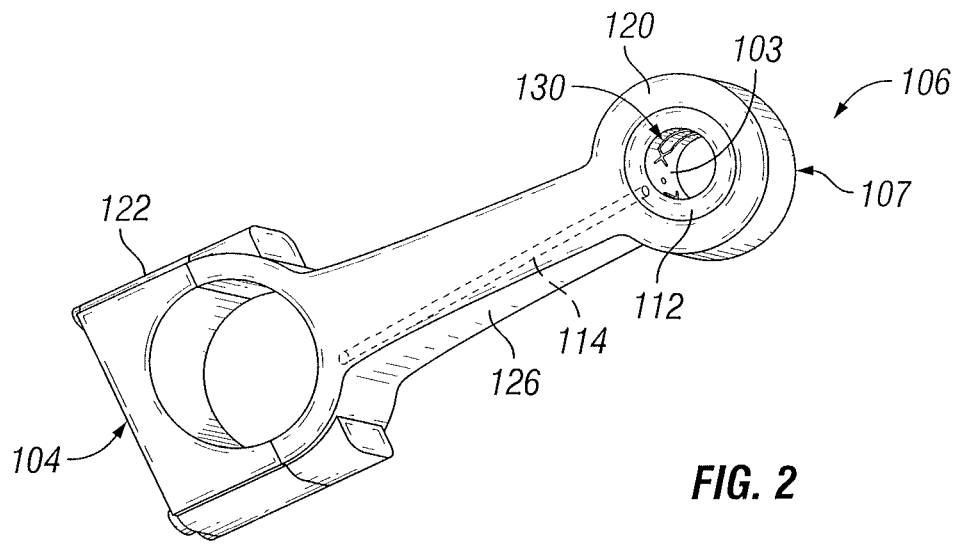
FIG. 2 is a perspective view of a connecting rod of the assembly of FIG. 1.

FIG. 1 shows an exploded view of an apparatus 100 forming a subassembly an internal combustion engine (not shown) which provides and improves lubrication between the piston and connecting rod interface. The apparatus 100 includes a pin 108 coupling a connecting rod 106, shown further in FIG. 2, to a piston 110 at a connection end or first end 107 of the connecting rod 106. Connecting rod 106 further includes an inner surface 103 that faces and surrounds the pin 108 and defines an opening that receives and rotatably connects connecting rod 106 to pin 108. In certain embodiments, the surface 103 is an inner surface of a bushing 112 that is positioned in the opening defined by a ring-shaped member 120 at first end 107 of connecting rod 106. In other embodiments the surface 103 may be an inner surface of the ring-shaped member 120 at first end 107 of the connecting rod 106 without a bushing 112.

In certain embodiments, the apparatus 100 is a portion of an internal combustion engine including a crankshaft 102 coupled to the connecting rod 106 at a second end 104 of the connecting rod 106. It is contemplated, however, that apparatus 100 may be a portion of any device including a connecting rod 106, such as a reciprocating pump and/or a reciprocating piston device. In certain embodiments, the connecting rod 106 includes a longitudinally extending lubrication fluid delivery passage 114 that is obliquely oriented to the central longitudinal axis 210 of connecting rod 106. The oblique orientation of passage 114 terminates at inner surface 103 with an opening 115 that is offset from central longitudinal axis 210. Lubrication fluid delivery passage 114 provides fluid communication between the surface 103 and a crankshaft lubrication system (not shown). Where the lubrication fluid delivery passage 114 is present, the hole 115 delivers lubrication fluid to the surface 103 to assist in lubrication, although in certain embodiments splashed lubrication fluid from the engine provides sufficient lubrication fluid to the surface 103 without a direct feed such as provided by lubrication fluid delivery passage 114. The lubrication fluid can be any suitable lubrication fluid, such as oil, but is not limited to such.

The connecting rod 106 includes second end 104 that is mounted to crankshaft 102. In one embodiment, second end 104 includes a clamping portion 122 that is separable from the remaining portion of connecting rod 106 and is configured to be positioned around a portion of crankshaft 102 for engagement with the remaining portion of connecting rod 106 with a plurality of fasteners 124 to secure connecting rod 106 therearound. In the illustrated embodiment, four screw type fasteners 124 are shown with two fasteners 124 at each side, although any suitable number and type of fasteners are contemplated.

Connecting rod 106 includes a shaft portion 126 that extends from second end 104 to ring member 120 at first end 107. Ring member 120 defines an opening 128 to receive bushing 112 therein. The connecting rod 106 includes a groove arrangement 130 on inner surface 103 of bushing 112, where inner surface 103 surrounds and at least partially contacts pin 108 that projects outwardly from ring member 120 and bushing 112 for connection with piston 110. The groove arrangement 130 on the inner surface 103 can collect, retain, and distribute oil or other lubricant within the space between bushing 112 and pin 108. In another embodiment, inner surface 103 and groove arrangement 130 are defined by ring member 120 without an intervening bushing.

Figure 3A:
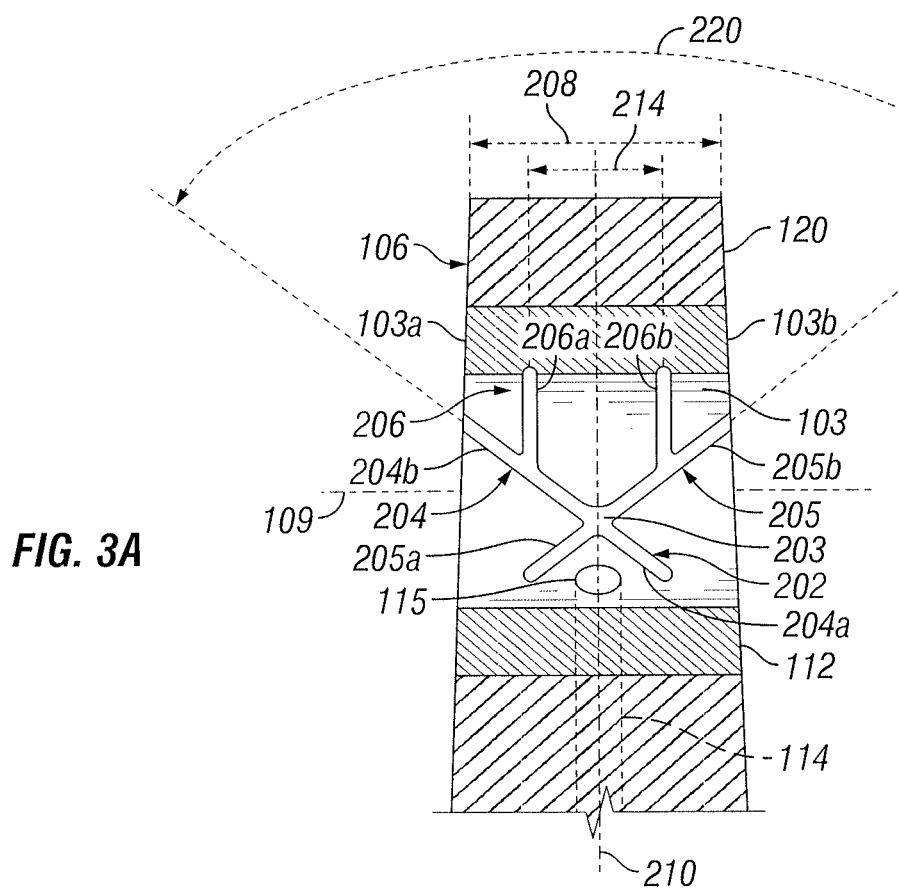
FIG. 3A is a section view of a connection end of the connecting rod along its central longitudinal axis showing a first portion of the groove arrangement according to a first embodiment.
Figure 3D:
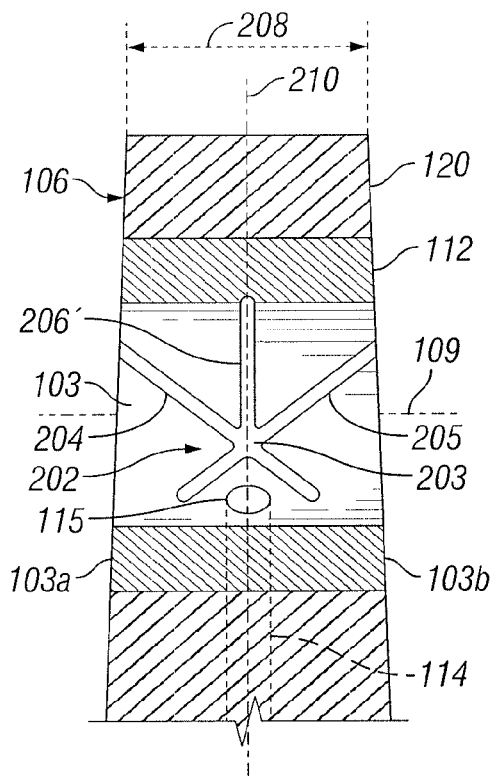
FIG. 3D is a plan view of an inner surface of a bushing in an unrolled configuration showing the groove arrangement according to the first embodiment of FIG. 3A.
Figure 3D:
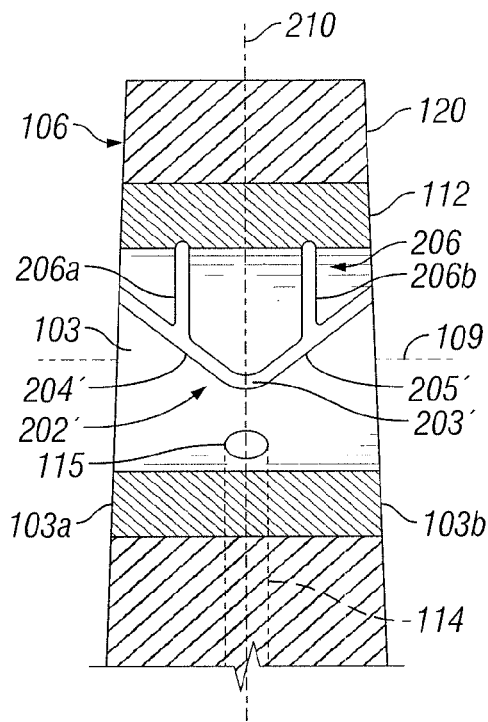
Figure 3D:
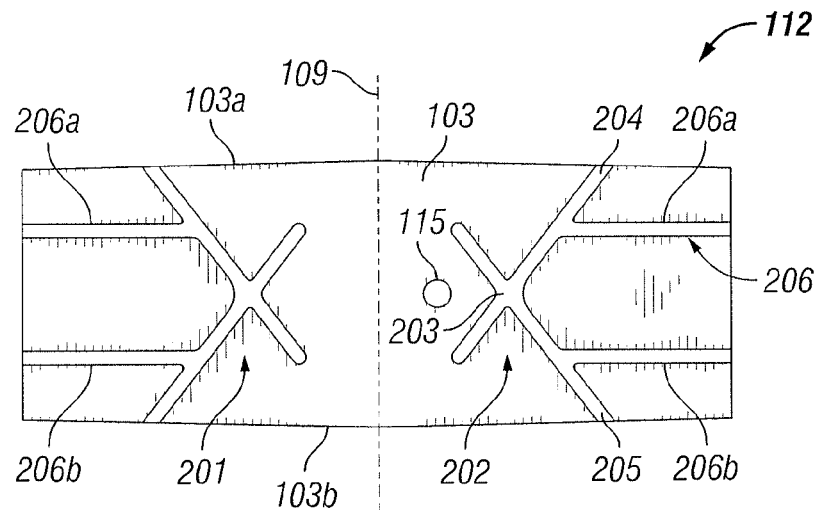

In certain embodiments, such as shown in FIGS. 3A and 3D, the surface 103 includes a groove arrangement 130 that retains lubrication fluid between surface 103 and pin 108 at any position of the connecting rod 106 relative to pin 108. Retaining lubrication fluid at any position of the connecting rod 106 means that during normal operation of the connecting rod 106, at least some lubrication fluid is retained in the groove arrangement 130 between inner surface 103 and pin 108. For example, the connecting rod 106 may be employed with an engine having reciprocating piston 110, and the groove arrangement 130 includes one or more grooves oriented such that at any crank angle position of crankshaft 102 for the engine, groove arrangement 130 retains some lubrication fluid in at least a part thereof to maintain lubrication. In certain embodiments, one or more portions of the groove arrangement 130 may not retain lubrication fluid during nominal operation and/or off-nominal operation. For example if the engine is run out of oil, or if the engine is oriented at an off-nominal pitch or roll, one or more portions of groove arrangement 130 may not retain lubricating fluid therein but may still be a portion of the groove arrangement 130 as contemplated herein.

In the embodiments of FIGS. 3A and 3D, the connecting rod 106 includes a groove arrangement 130 with first and second transverse groove portions 201, 202 extending substantially across a full width of the surface 103 in a direction generally along an axis of rotation 109 that extends along and is defined by pin 108. The extension of the first and second groove portions 201, 202 substantially across the width 208 of the surface 103 includes the grooves having ends at a location on and/or through one or both edges 103a, 103b of surface 103 to allow the collection of lubrication fluid running down one or both of the outer faces of bushing 112 and/or ring member 120 and the distribution of lubrication fluid to at least the respective groove portion. In certain embodiments, the first and second groove portions 201, 202 are identical and each include first and second grooves 204, 205 (FIG. 3A) that are obliquely oriented to one another and to axis 109 and extend to respective ones of the first and second edges 103a, 103b. In certain embodiments, the first and second transverse groove portions 201, 202 that extend substantially across a full width of the surface 103 by extending across a majority of the width 208 of the surface 103 between edges 103a, 103b. In certain embodiments, the first and second groove transverse portions 201, 202 extend substantially across a full width 208 of the surface 103 by extending across at least 80% of the width of the surface 103 between the opposite edges 103a, 103b.

Groove arrangement 130 also includes at least one inner circumferential groove portion 206 extending around at least a portion of the inner circumference of inner surface 103 between first and second transverse groove portions 201, 202 in inner surface 103. In certain embodiments, the at least one inner circumferential groove portion 206 includes first and second inner circumferential grooves 206a, 206b extending around inner surface 103 adjacent respective ones of the edges 103a, 103b in a parallel or non-parallel arrangement and terminating at and in fluid communication with respective ones of the first and second transverse groove portions 201, 202.

In certain embodiments, the grooves comprising groove arrangement 130 are shallow indentations that can collect, retain, and distribute oil without negatively affecting the structural integrity of the bushing 112 and/or the ring member 120 of connecting rod 106. In certain embodiments, the grooves are about 0.5 mm in depth. Other depths for the grooves are contemplated herein, and further the different grooves of groove arrangement 130 may be at varying depths.

In the embodiment illustrated in FIG. 3A, transverse groove portion 202 includes first and second grooves 204, 205 extending outwardly from an intersection 203 to respective ones of the first and second edges 103a, 103b of inner surface 103. Grooves 204, 205 each include a tail portion 204a, 205a, respectively, extending from the intersection 203 in an opposite direction away from the remaining portion 204b, 205b of the groove 204, 205 and toward the opposite edge 103b, 103a for a distance that is at least a quarter of width 208 of the surface 103. Thus, in the illustrated embodiment, grooves 204, 205 from an X-shape adjacent intersection 203.

Referring to FIG. 1, pin 108 defines a first surface portion 108a that faces first end 107 and a second surface portion 108b that faces second end 104. In certain embodiments, at least a portion of the first and second transverse groove portions 201, 202 are located along second surface portion 108b at any operating position of the connecting rod 106 relative to pin 108, thereby retaining lubrication fluid therein between pin 108 and surface 103 during normal operation. For example, during operation the force of the crankshaft 102 pulling the connecting rod 106 and pin 108 together captures oil in the first and second transverse groove portions 201, 202 when oil would otherwise be expressed from this area or vacate this area due to gravity. In one embodiment, intersection 203 provides a well or retention area in which lubrication fluid can accumulate so that a source of lubrication fluid is always available.

In certain embodiments, first and second grooves 204, 205 are obliquely oriented to one another and define an included angle 220 therebetween that is more than 90 degrees. In certain embodiments, the first and second grooves 204, 205 define an included angle 220 ranging from 90 degrees to about 170 degrees. In one particular embodiment, included angle 220 is about 120 degrees.

In the embodiment illustrated in FIGS. 3A and 3D, the circumferential groove portion 206 includes first and second inner circumferential grooves 206a, 206b extending along respective ones of the edges 103a, 103b between respective ones of the transverse groove portions 201, 202. Circumferential groove portion 206 extends along first surface portion 108a of pin 108 to provide an avenue for collection and distribution of lubrication fluid around the perimeter of pin 108. In certain embodiments, circumferential groove portion 206 extends around more than 50% of the perimeter of pin 108 and entirely around surface portion 108a.

In the embodiment illustrated in FIG. 3A, the inner circumferential grooves 206a, 206b parallel the respective adjacent edge 103a, 103b. In embodiments where width 208 tapers toward first end 107 as shown in FIG. 3A, inner circumferential grooves 206a, 206b converge toward one another as they approach central longitudinal axis 210 and diverge in a direction toward the respective transverse groove portion 201, 202. In still other embodiment, grooves 206a, 206b are formed parallel or approximately parallel to one another and/or to central longitudinal axis 210. Approximately parallel, as used herein, includes any angle less than about 30 degrees from parallel, less than about 15 degrees from parallel, and less than about 5 degrees from parallel with one another and/or the central longitudinal axis 210. In certain embodiments, grooves 206a, 206b include a maximum separation distance 212 that is at least one-quarter of the width 208 of the surface 103 between edges 103a, 103b. In certain embodiments, the grooves 206a, 206b may be separated along all or a portion of their length by a separation distance 212 that is less than one-quarter of the width 208 of the surface 103 between edges 103a, 103b.

FIG. 3B is an illustration of a second embodiment of groove arrangement 130 which includes first and second transverse groove portions 201, 202 configured as discussed above and an inner circumferential groove portion 206'. Inner circumferential groove portion 206' includes a single groove formed along or approximately parallel to central longitudinal axis 210 such that the groove approximately bisects width 208 of the surface 103. In other embodiments, the single inner circumferential groove 206' is positioned in an offset relation from the mid-width of the surface 103.

FIG. 3C is an illustration of a third embodiment of groove arrangement 130. In the embodiment illustrated in FIG. 3C, the first transverse groove portion 202' includes first and second grooves 204', 205' that meet at intersection 203' and form a shallow V-shape and lack tail portions extending from the intersection as discussed above with respect to grooves 204, 205. A same or similar transverse groove portion can be provided on the other side of central longitudinal axis 210 such as in the same location for transverse groove portion 201 shown in FIG. 3D. The embodiment of FIG. 3C includes an inner circumferential groove portion 206 with inner circumferential grooves 206a, 206b configured as discussed above with respect to FIGS. 3A and 3D. Alternatively, the embodiment of FIG. 3C can be provided with a single inner circumferential groove portion such as shown in FIG. 3B for inner circumferential groove portion 206'.

Figure 4:
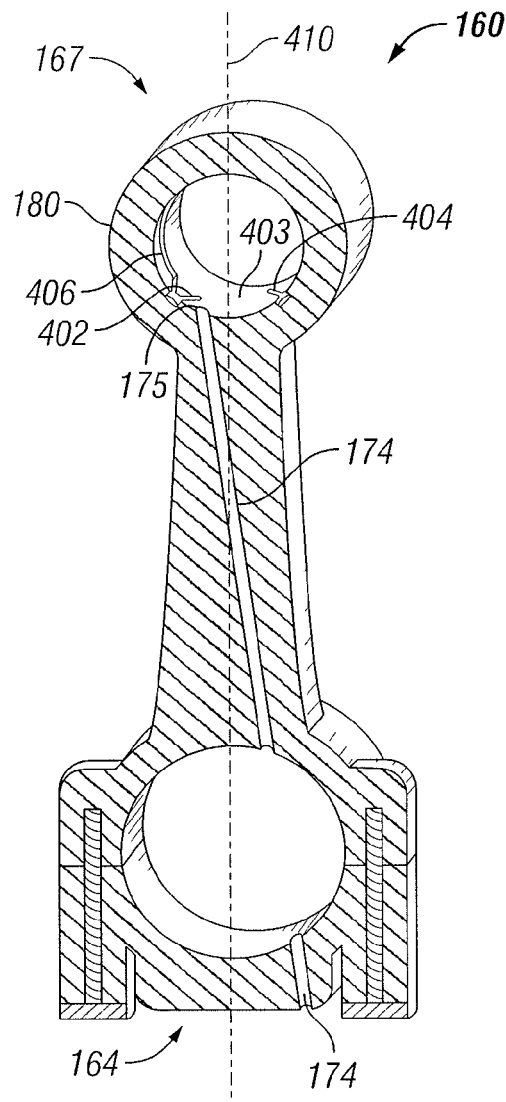
FIG. 4 is a longitudinal section view of another embodiment connecting rod.

FIG. 4 is an illustration of another connecting rod embodiment 160 having a ring shaped member 180 at first end 167 with an inner surface 403 defining a first transverse groove portion 402, a second transverse groove portion 404, and a circumferential groove portion 406 that can be arranged according to any of the embodiments of the groove arrangements 130 discussed herein. In certain embodiments, the connecting rod 160 further includes a lubrication fluid delivery passage 174 with an opening 175 between the first and second transverse groove portions 402, 404. In certain embodiments, the lubrication fluid delivery passage 174 comprises a diagonally positioned elongated passage that is obliquely oriented to central longitudinal axis 410 of connecting rod 160, and the delivery hole 175 provides fluid communication between the inner surface 403 and a crankshaft lubrication system (not shown). The lubrication fluid delivery passage 174 may provide lubrication fluid from the crankshaft-connecting rod interface, and/or the delivery passage 174 may continue through the mounting bracket at first end 164 of the connecting rod 160 and provide lubrication fluid from the oil sump through the crankshaft. Delivery hole 175 is offset to one side of central longitudinal axis 410 to avoid being located in an area of high stress concentrations.

Figure 5:
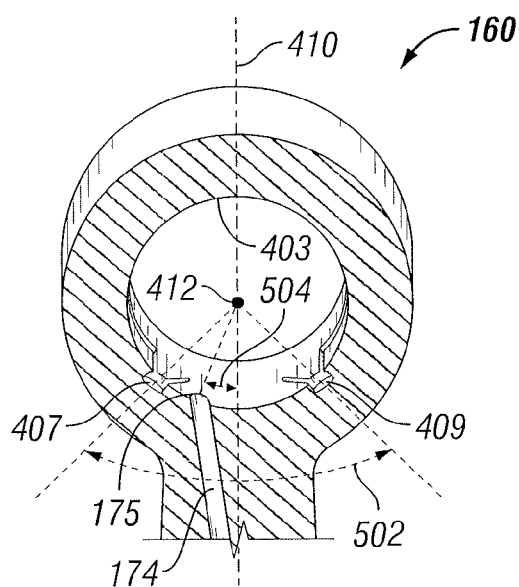
FIG. 5 is an enlarged longitudinal section view of the connection end of the connecting rod of FIG. 4 showing the opening of the lubrication fluid delivery passage relative to the groove arrangement.

FIG. 5 is an illustration of connecting rod 160 and a location for delivery hole 175 in inner surface 403 such that hole 175 does not intersect first or second transverse groove portions 402, 404. It should be understood, however, that delivery hole 115 through bushing 112 can be similarly positioned relative to connecting rod 106. Delivery hole 175 is provided at a location offset from central longitudinal axis 410 and within the radial angle 502 defined between first and second transverse groove portions 402, 404. The radial angle 502 is measured from the intersection 412 of rotation axis 109 defined by pin 108 with central longitudinal axis 410, and is a radial angle that defines the separation between the first transverse groove portion 402 and the second transverse groove portion 404. In certain embodiments, the first transverse groove portion 402 and the second transverse groove portion 404 are separated equi-angularly from central longitudinal axis 410, and include intersections 407, 409, respectively, that are separated from one another by radial angle 502 ranging from about 150 degrees to about 90 degrees. In one particular embodiment, radial angle 502 is 120 degrees. In another particular embodiment, delivery hole 175 is offset by a radial angle 504 of about 25 degrees from central longitudinal axis 410.

As is evident from the figures and description herein, a variety of aspects are contemplated. One aspect is an apparatus including an elongated connecting rod extending from a first end to a second end along a central longitudinal axis. The apparatus includes a pin defining a rotation axis that is transversely oriented to the central longitudinal axis. The pin couples the connecting rod to a piston at the first end of the connecting rod. The connecting rod includes a surface that extends around and faces the pin and the rotation axis. The surface comprises opposite first and second edges spaced from one another along the rotation axis that define a width therebetween, a first transverse groove portion extending generally along the rotation axis substantially across the width of the surface, and at least one inner circumferential groove portion connected to and in fluid communication with the first transverse groove portion, and the inner circumferential groove portion extends at least partially around the rotation axis.

Various embodiments of this aspect are contemplate. In one embodiment, the first transverse groove portion includes first and second grooves that intersect one another between the first and second edges and the first and second grooves each extend outwardly from the intersection to respective ones of the first and second edges. In a refinement of this embodiment, each of the first and second grooves includes a tail portion that extends from the intersection in a direction opposite a remaining portion thereof so that the first and second grooves form an X-shape adjacent the intersection.

In a further refinement, each tail portion extends about one-quarter of the width between the first and second edges. In another refinement of this embodiment, the pin defines a first surface portion facing the first end of the connecting rod and an opposite second surface portion facing the second end of the connecting rod, and the intersection of the first and second grooves is located along the second surface portion at any operational position of the connecting rod relative to the pin. In yet another refinement, the first and second grooves define an included angle therebetween that is at least 90 degrees. In a further refinement, the included angle is about 120 degrees.

In another embodiment, the at least one inner circumferential groove portion includes a first inner circumferential groove adjacent the first edge and a second inner circumferential groove adjacent the second edge. In one refinement, the first and second inner circumferential grooves extend around at least 180 degrees of the inner surface.

In another embodiment, the first transverse groove portion is offset to a first side of the central longitudinal axis when viewed in a direction along the rotation axis defined by the pin. In a refinement of this embodiment, the surface includes a second transverse groove portion extending generally along the rotation axis substantially across the width of the surface, and the second transverse groove portion is offset to a second side of the central longitudinal axis that is opposite the first side when viewed in the direction along the rotation axis. In yet a further refinement, the at least one inner circumferential groove portion extends between and is in fluid communication with the first and second transverse groove portions. In yet a further refinement, the at least one inner circumferential groove portion includes first and second inner circumferential grooves adjacent respective ones of the first and second edges that extend between and are in fluid communication with each of the first and second transverse groove portions. In another refinement the at least one inner circumferential groove portion includes a circumferential groove that is centered between the first and second edges and extends between and is in fluid communication with each of the first and second transverse groove portions.

In another embodiment, the connecting rod defines a lubrication fluid delivery passage extending from the second end in an oblique orientation to the central longitudinal axis to an opening located between the first and second transverse groove portions. In a refinement of this embodiment, the opening is offset from the central longitudinal axis toward one of the first and second transverse groove portions.

In another embodiment, the surface comprises an inner surface of a bushing. In yet another embodiment, the first end of the connecting rod includes a ring shaped member defining an opening extending along the rotation axis and the surface is located within the opening.

According to another aspect, an apparatus includes an elongated connecting rod extending from a first end to a second end along a central longitudinal axis, and a pin defining a rotation axis that is transversely oriented to the central longitudinal axis. The pin couples the connecting rod to a piston at the first end of the connecting rod, and the connecting rod includes a surface that extends around and faces the pin and the rotation axis. The surface extends between opposite first and second edges spaced from one another along the rotation axis. The surface includes a groove arrangement that is configured to collect lubrication fluid from at least one of the first and second edges, retain the lubrication fluid in at least one location between the first and second edges, and distribute lubrication fluid circumferentially around the pin.

In one embodiment of this aspect, the groove arrangement includes a first transverse groove portion extending generally along the rotation axis substantially across a substantial portion of a width of the surface between the first and second edges, and at least one inner circumferential groove portion connected to and in fluid communication with the first transverse groove portion. The inner circumferential groove portion extends at least partially around the rotation axis. In a refinement of this embodiment, the first transverse groove portion includes first and second grooves that intersect one another between the first and second edges and the first and second grooves each extend outwardly from the intersection to respective ones of the first and second edges. In a further refinement, each of the first and second grooves includes a tail portion that extends from the intersection in a direction opposite a remaining portion thereof to form an X-shape. In another refinement, the pin defines a first surface portion facing the first end of the connecting rod and an opposite second surface portion facing the second end of the connecting portion, and the intersection of the first and second grooves is located along the second surface portion at any operational position of the connecting rod relative to the pin and the inner circumferential groove portion extends around the first surface of the pin. In a further refinement, the at least one inner circumferential groove portion includes a first inner circumferential groove adjacent the first edge and a second inner circumferential groove adjacent the second edge.

In another embodiment, the first transverse groove portion is offset to a first side of the central longitudinal axis when viewed in a direction along the rotation axis, the surface includes a second transverse groove portion extending generally along the rotation axis substantially across the width of the surface, the second transverse groove portion is offset to a second side of the central longitudinal axis that is opposite the first side, and the at least one inner circumferential groove portion extends between and is in fluid communication with the first and second transverse groove portions. In a refinement of this embodiment, the at least one inner circumferential groove portion includes first and second inner circumferential grooves that extend between and are in fluid communication with each of the first and second transverse groove portions. In another refinement, the at least one inner circumferential groove portion includes a circumferential groove that is centered between the first and second edges and extends between and is in fluid communication with each of the first and second transverse groove portions.

According to another aspect, an internal combustion engine includes a connecting rod extending along a central longitudinal axis between a first end and an opposite second end and a pin extending from the first end of the connecting rod to a piston. The pin defines a rotation axis transverse to the central longitudinal axis, and the pin includes a first surface portion facing the first end of the connecting rod and an opposite second surface portion facing the second end of the connecting rod. The engine also includes a crankshaft coupled to the second end of the connecting rod and a bushing housed in the first end of the connecting rod around the pin. The bushing includes an inner surface around the pin that defines a groove arrangement including a first transverse groove portion extending along the rotation axis along the second surface of the pin on a first side of the central longitudinal axis when viewed in the direction of the rotation axis, a second transverse groove portion extending along the rotation axis along the second surface of the pin on a second side of the central longitudinal axis opposite the first side, and a circumferential groove portion extending along the first surface of the pin and that interconnects and is in fluid communication with the first transverse groove portion and the second transverse groove portion.

In one embodiment, each of the first and second transverse groove portions includes a first transverse groove and a second transverse groove, the first and second transverse grooves being connected to one another at an intersection and extending outwardly from the intersection to respective ones of opposite first and second edges of the bushing. In a refinement of this embodiment, the circumferential groove portion includes a first circumferential groove adjacent the first edge and a second circumferential groove adjacent the second edge. In another refinement, each of the first and second grooves of each of the first and second transverse groove portions includes a tail portion that extends from the intersection in a direction opposite a remaining portion thereof so that the first and second grooves form an X-shape adjacent the intersection. In another refinement, each of the first and second grooves intersect to form a V-shape.

While the invention has been illustrated and described in detail in the drawings and foregoing description, the same is to be considered as illustrative and not restrictive in character, it being understood that only certain illustrative embodiments have been shown and described and that all changes and modifications that come within the spirit of the inventions are desired to be protected. It should be understood that any relative characterization of embodiments such as but not limited to preferable, preferably, preferred, more preferred, advantageous, or exemplary utilized in the description above indicate that the embodiments or features thereof so described may be more desirable or characteristic, nonetheless the embodiments or features thereof may not be necessary and embodiments lacking the same may be contemplated as within the scope of the invention, the scope being defined by the claims that follow.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus, comprising:
    an elongated connecting rod extending from a first end to a second end along a central longitudinal axis;
    a pin defining a rotation axis that is transversely oriented to the central longitudinal axis, the pin coupling the connecting rod to a piston at the first end of the connecting rod, wherein the connecting rod includes a surface that extends around and faces the pin and the rotation axis, the surface extending between opposite first and second edges spaced from one another along the rotation axis, the surface comprising a groove arrangement that is configured to collect lubrication fluid from at least one of the first and second edges, retain the lubrication fluid in at least one location between the first and second edges, and distribute lubrication fluid circumferentially around the pin, wherein the groove arrangement includes a first transverse groove portion extending generally along the rotation axis substantially across a substantial portion of a width of the surface between the first and second edges, the first transverse groove portion includes first and second grooves that intersect one another between the first and second edges and the first and second grooves each extend outwardly from the intersection to respective ones of the first and second edges, and further comprising a hole opening through the surface for delivering lubrication fluid to the surface, wherein the hole is offset from the central longitudinal axis and does not intersect the groove arrangement.

2. The apparatus of claim 1, wherein the groove arrangement includes:
    at least one inner circumferential groove portion connected to and in fluid communication with the first transverse groove portion, the inner circumferential groove portion extending at least partially around the rotation axis.

3. The apparatus of claim 1, wherein each of the first and second grooves includes a tail portion that extends from the intersection in a direction opposite a remaining portion thereof to form an X-shape.

4. The apparatus of claim 2, wherein the pin defines a first surface portion facing in a first direction along the central longitudinal axis toward the first end of the connecting rod and an opposite second surface portion facing in a second direction along the central longitudinal axis toward the second end of the connecting rod, and the intersection of the first and second grooves is located along the second surface portion at any operational position of the connecting rod relative to the pin and the inner circumferential groove portion extends around the first surface portion of the pin.

5. The apparatus of claim 4, wherein the at least one inner circumferential groove portion includes a first inner circumferential groove adjacent the first edge and a second inner circumferential groove adjacent the second edge.

6. The apparatus of claim 2, wherein:
    the first transverse groove portion is offset to a first side of the central longitudinal axis when viewed in a direction along the rotation axis;
    the surface includes a second transverse groove portion extending generally along the rotation axis substantially across the width of the surface;
    the second transverse groove portion is offset to a second side of the central longitudinal axis that is opposite the first side; and
    the at least one inner circumferential groove portion extends between and is in fluid communication with the first and second transverse groove portions.

7. The apparatus of claim 6, wherein the at least one inner circumferential groove portion includes first and second inner circumferential grooves that extend between and are in fluid communication with each of the first and second transverse groove portions.

8. The apparatus of claim 6, wherein the at least one inner circumferential groove portion includes a circumferential groove that is centered between the first and second edges and extends between and is in fluid communication with each of the first and second transverse groove portions.

* * * * *